United States Patent
Dwyer

(10) Patent No.: US 9,867,330 B2
(45) Date of Patent: Jan. 16, 2018

(54) RIDING LAWN CARE VEHICLE AUTO IDLE SYSTEM

(71) Applicant: HUSQVARNA AB, Huskvarna (SE)

(72) Inventor: Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/773,175

(22) PCT Filed: Mar. 13, 2014

(86) PCT No.: PCT/US2014/025690
§ 371 (c)(1),
(2) Date: Sep. 4, 2015

(87) PCT Pub. No.: WO2014/160041
PCT Pub. Date: Oct. 2, 2014

(65) Prior Publication Data
US 2016/0014954 A1 Jan. 21, 2016

Related U.S. Application Data

(60) Provisional application No. 61/779,629, filed on Mar. 13, 2013.

(51) Int. Cl.
*F02D 41/08* (2006.01)
*A01D 34/00* (2006.01)
(Continued)

(52) U.S. Cl.
CPC .......... *A01D 34/006* (2013.01); *A01D 34/64* (2013.01); *B60W 30/1886* (2013.01);
(Continued)

(58) Field of Classification Search
CPC ........ F02D 41/02; F02D 41/021; F02D 41/08; F02D 41/042; F02N 11/0814; Y02T 10/48; B60Y 2200/223
(Continued)

(56) References Cited

U.S. PATENT DOCUMENTS

| 5,321,939 A | 6/1994 | Fuse et al. |
| 2004/0053742 A1 | 3/2004 | Schaedler et al. |

(Continued)

FOREIGN PATENT DOCUMENTS

| EP | 1813141 A2 | 8/2007 |
| EP | 2101054 A2 | 9/2009 |

OTHER PUBLICATIONS

International Search Report & Written Opinion dated Jul. 18, 2014 in the International Patent Application No. PCT/US2014/025690.
(Continued)

*Primary Examiner* — Hung Q Nguyen
*Assistant Examiner* — Johnny H Hoang
(74) *Attorney, Agent, or Firm* — McNair Law Firm, P.A.

(57) ABSTRACT

A riding lawn care vehicle may include a mobility assembly configured to support the riding lawn care vehicle during movement over ground, a working assembly configured to perform a working function, an engine operably coupled to the mobility assembly and the working assembly, a drive control system, and an auto idle assembly. The engine may be configured to selectively provide power to the mobility assembly and the working assembly. The drive control system may be configured to control delivery of the power from the engine to the mobility assembly. The auto idle assembly may be configured to automatically provide inputs to the drive control system to shift to an idle mode responsive to detection of predetermined criteria.

18 Claims, 6 Drawing Sheets

(51) Int. Cl.
*A01D 34/64* (2006.01)
*B60W 30/188* (2012.01)
*F02D 41/02* (2006.01)

(52) U.S. Cl.
CPC ....... *B60W 30/1888* (2013.01); *F02D 41/021* (2013.01); *F02D 41/08* (2013.01); *B60Y 2200/223* (2013.01); *Y02P 60/142* (2015.11)

(58) Field of Classification Search
USPC ...... 123/339.1, 339.15, 339.23, 339.26, 319, 123/376, 361, 179.4, 198 D; 701/110, 701/112
See application file for complete search history.

(56) References Cited

U.S. PATENT DOCUMENTS

| | | | |
|---|---|---|---|
| 2004/0084002 A1* | 5/2004 | Mitsutani | F02D 41/021 123/179.4 |
| 2006/0048734 A1* | 3/2006 | Kataoka | B60K 6/485 123/179.4 |
| 2007/0199533 A1* | 8/2007 | Takahashi | F02D 17/04 123/179.4 |
| 2008/0091309 A1 | 4/2008 | Walker | |
| 2008/0209877 A1 | 9/2008 | Turner et al. | |
| 2009/0031699 A1 | 2/2009 | Landes et al. | |
| 2009/0182470 A1 | 7/2009 | Garvey et al. | |
| 2010/0125383 A1* | 5/2010 | Caouette | B63H 21/17 701/21 |
| 2011/0017165 A1* | 1/2011 | Osawa | F02N 11/0818 123/179.4 |
| 2011/0048608 A1* | 3/2011 | Dods | B65C 9/1869 156/64 |
| 2011/0214641 A1 | 9/2011 | Vaughn et al. | |
| 2013/0025957 A1 | 1/2013 | Ellsworth | |
| 2013/0139775 A1* | 6/2013 | Moriya | F02N 11/0851 123/179.3 |
| 2013/0180500 A1* | 7/2013 | Nishina | F02D 28/00 123/339.19 |
| 2013/0206885 A1* | 8/2013 | Ueda | B02C 18/0084 241/101.72 |
| 2013/0227936 A1* | 9/2013 | Takahashi | E02F 9/2235 60/297 |
| 2014/0052350 A1* | 2/2014 | Tsuruga | E02F 3/325 701/50 |

OTHER PUBLICATIONS

International Preliminary Report on Patentability dated Sep. 15, 2015 in International Patent Application No. PCT/US2014/09666.

* cited by examiner

RIDING LAWN CARE VEHICLE AUTO IDLE SYSTEM

TECHNICAL FIELD

Example embodiments generally relate to outdoor power equipment and, more particularly, some embodiments relate to a system for automatically shifting a riding lawn care vehicle to an idle throttle setting in response to predefined criteria.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn care vehicles (e.g., riding mowers) can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

The convenience and versatility of riding lawn care vehicles makes them very popular among consumers. However, riding lawn care vehicles come in many varieties and therefore they can employ different steering, propulsion, and cutting systems, among other potential differences. Accordingly, control and operation of each different variety of riding lawn care vehicle can be a little different. Regardless of the specific configuration, one common characteristic of most riding vehicles is that they employ some form of throttle control. The throttle control can be as simple as an on/off or forward/reverse lever, or a more complicated control lever or pedal that enables precise speed control settings to be provided.

For some varieties of riding lawn care vehicles, the throttle may be set to operate at a given speed (e.g., full speed) and the brake may be applied. The action of holding the brake down may cause the drive system to be disengaged, but the engine may remain at full throttle. Thus, although the vehicle slows and perhaps even stops, the throttle may remain set at fully open for full speed operation. Accordingly, for example, if the operator releases the brake, the fully open throttle may suddenly cause the vehicle to lunge forward. This lunge forward could startle the driver, spill drinks or other cargo, or even cause excessive wear or damage to system components.

BRIEF SUMMARY OF SOME EXAMPLES

Some example embodiments may provide a mechanism by which to prevent sudden lunges of riding lawn care vehicles during operation under the circumstances described above. Some embodiments may further improve fuel economy, reduce noise, reduce emissions, and extend part life by providing an automatically initiated throttle control system that will shift the engine to an idle setting when certain predefined criteria are met. This type of throttle control, which may be referred to as an automatic or auto idle feature, may be implemented via mechanical components and linkages and/or via electronic control.

According to an example embodiment, a riding lawn care vehicle may be provided. The riding lawn care vehicle may include a mobility assembly configured to support the riding lawn care vehicle during movement over ground, a working assembly configured to perform a working function, an engine operably coupled to the mobility assembly and the working assembly, a drive control system, and an auto idle assembly. The engine may be configured to selectively provide power to the mobility assembly and the working assembly. The drive control system may be configured to control delivery of the power from the engine to the mobility assembly. The auto idle assembly may be configured to automatically provide inputs to the drive control system to shift to an idle mode responsive to detection of predetermined criteria.

Some example embodiments may improve the ability of operators to operate outdoor power equipment such as riding lawn care vehicles. Operators may therefore take fuller advantage of the capabilities of their riding lawn care vehicles, and have a greater satisfaction with the performance of their riding lawn care vehicles.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
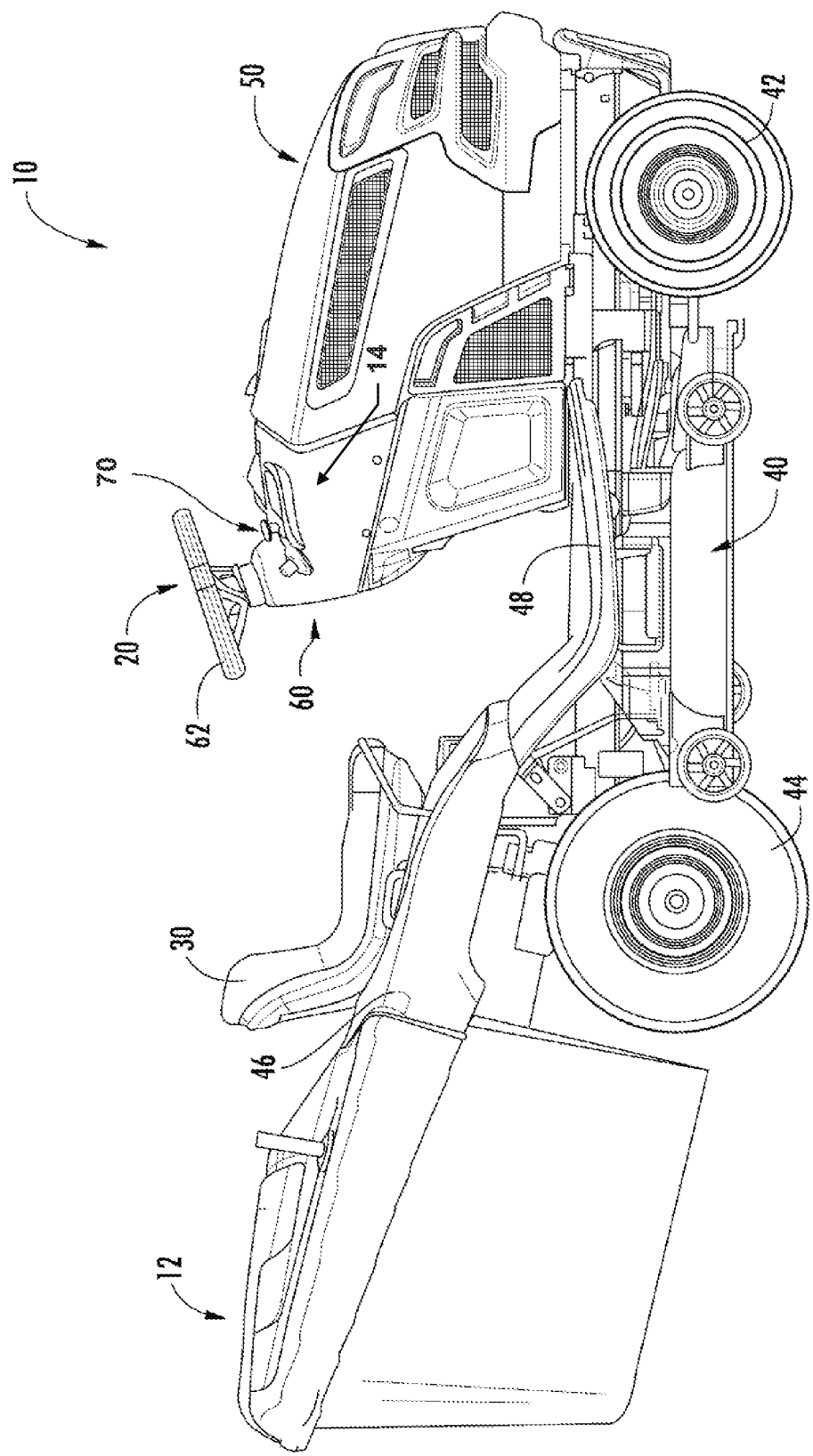
FIG. 1 illustrates a perspective view of the riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf, or sod care. As used herein, operable coupling should be understood to relate to direct or indirect connection that, in either case, enables functional interconnection of components that are operably coupled to each other.

Figure 2:
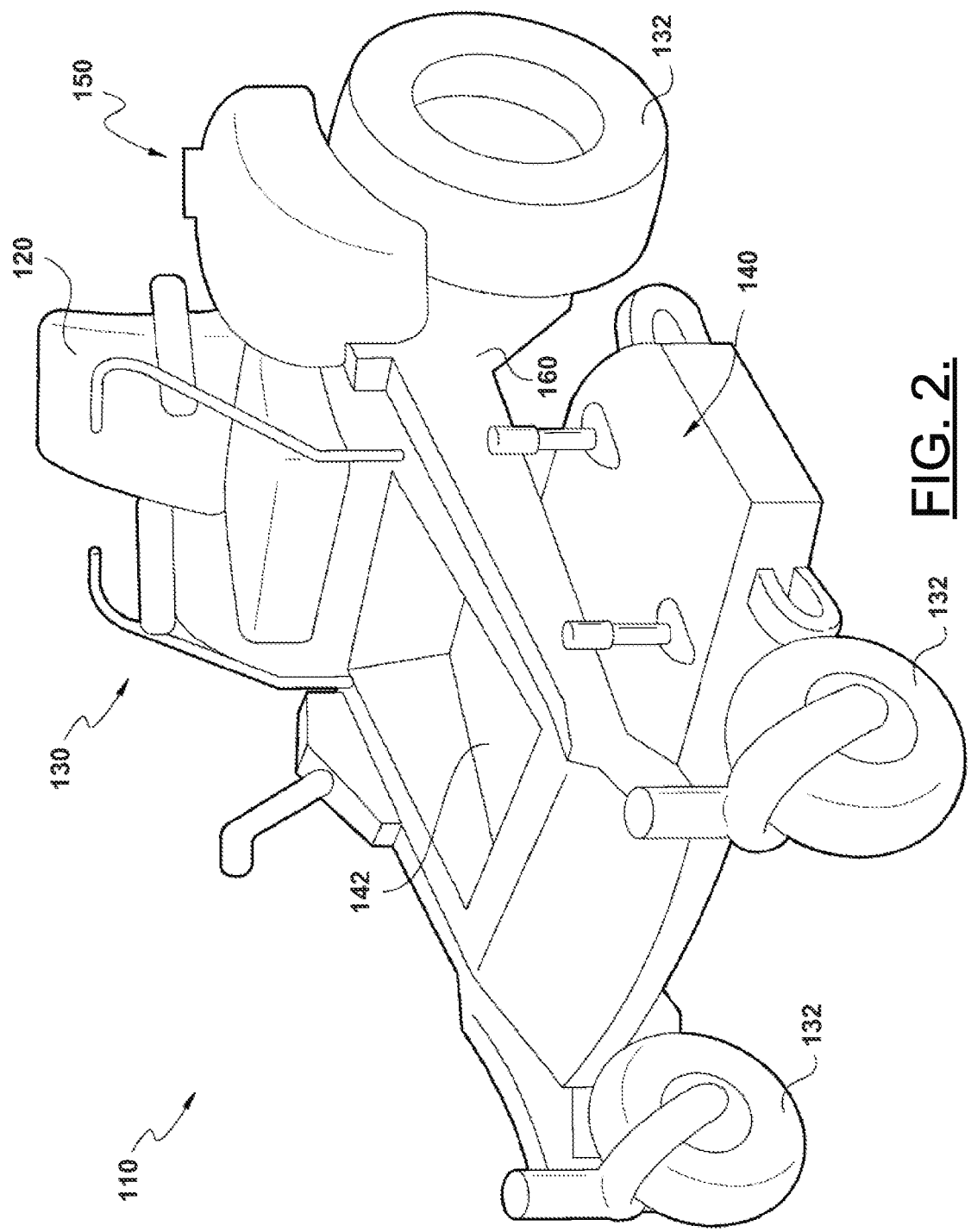
FIG. 2 illustrates a riding lawn care vehicle having a relatively fixed ground speed capability according to an example embodiment.

As indicated above, riding lawn care vehicles come in many different varieties (e.g., a lawn tractor, front-mount riding lawn mower, riding lawn mower with relatively short or near zero degree turning radius, cross mower, stand-on riding lawn mower, and/or the like). Thus, throttle control issues may be slightly different for each different variety. In spite of the subtle differences that may exist relative to different varieties of riding lawn care vehicle, the general concept and implementation of example embodiments on such varieties may be substantially the same. However, in order to further explain how some varieties of riding lawn care vehicle might be specifically impacted by operation of example embodiments, an example of two different general types of riding lawn care vehicle will be briefly provided below. In this regard, FIG. 1 illustrates a side view of a riding lawn care vehicle with a variable ground speed. FIG. 2 illustrates a perspective view of a riding lawn care vehicle having a fixed ground speed capability.

Referring first to FIG. 1, the riding lawn care vehicle 10 may include a bagging attachment 12. However, it should be appreciated that example embodiments may be employed on numerous other riding lawn care vehicles that may not include a bagging attachment 12. The riding lawn care vehicle 10 may also include an operations panel 14 that may display operational information regarding the riding lawn care vehicle 10 and host various controls, gauges, switches, displays, and/or the like.

The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear, or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments, the shafts are coupled to a motor via a system of belts and pulleys. In other embodiments, the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, cutting height adjusters, and/or the like. Some of the controllers, such as the speed controllers, may be provided in the form of foot pedals that may sit proximate to a footrest 48 (which may include a portion on both sides of the riding lawn care vehicle 10) to enable the operator to rest his or her feet thereon while seated in the seat 20. However, in other cases, a throttle control lever may be provided at or near the operations panel 14.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. The drive power may be applied on the basis of a throttle control setting provided by the throttle control lever or pedal. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

In an example embodiment, the engine 50 may turn at least one shaft that is coupled to corresponding ones of one or more cutting blades within the cutting deck 40 via a PTO clutch. When the PTO clutch is engaged, rotary power generated by the engine 50 may be coupled to the one or more cutting blades to cause rotation thereof (e.g., for cutting grass) via a belt drive system. When the PTO clutch is disengaged, rotary power generated by the engine 50 may not be coupled to the one or more cutting blades and thus the cutting blades may not rotate by virtue of the tension on the belt drive system being released. In some embodiments, engagement of the PTO clutch may be accomplished via operation of a PTO switch 70 that may be disposed on or proximate to the operations panel 14.

FIG. 2 illustrates a riding lawn care vehicle 110 having a relatively fixed ground speed capability according to an example embodiment. Although FIG. 2 illustrates a riding lawn care vehicle 110 that employs a hydrostatic fender-shift drive system, it should be appreciated that other fixed ground speed drive systems, such as a gear drive, may also be employed in some cases. In an example embodiment, the riding lawn care vehicle 110 may include a seat 120 that may be disposed at a center, rear, or front portion of the riding lawn care vehicle 110. The riding lawn care vehicle 110 may also include a steering assembly 130 (e.g., a set of steering levers or the like) functionally connected to the wheels 132 of the riding lawn care vehicle 110 to allow the operator to steer the riding lawn care vehicle 110. The operator may sit on the seat 120, which may be disposed to the rear of the steering assembly 130, to provide input for steering of the riding lawn care vehicle 110 via the steering assembly 130. However, some models may be stand-up models that eliminate the seat 120. If the seat 120 is eliminated, the operator typically stands at an operator station proximate to the steering assembly 130.

The riding lawn care vehicle 110 may also include a cutting deck 140 having at least one cutting blade mounted therein. The cutting deck 140 may be positioned behind the front pair of wheels 132 in a position to enable the operator to cut grass using the cutting blade when the cutting blade is rotated below the cutting deck 140 when the cutting deck 140 is in a cutting position. However, in some alternative examples, the cutting deck 140 may be positioned in front of the front pair of wheels 132. In some embodiments, a footrest 142 may also be positioned above the cutting deck 140 forward of the seat 120 to enable the operator to rest his or her feet thereon while seated in the seat 120. When operating to cut grass, the grass clippings may be captured by a collection system, mulched, or expelled from the cutting deck 140 via either a side discharge or a rear discharge.

In the pictured example embodiment, an engine 150 of the riding lawn care vehicle 110 is disposed to the rear of a seated operator. However, in other example embodiments, the engine 150 could be in different positions such as in front of or below the operator. As shown in FIG. 2, the engine 150 may be operably coupled to one or more of the wheels 132 to provide drive power for the riding lawn care vehicle 110. The engine 150, the steering assembly 130, the cutting deck 140, the seat 120, and other components of the riding lawn care vehicle 110 may be operably connected (directly or indirectly) to a frame 160 of the riding lawn care vehicle 110. The frame 160 may be a rigid structure configured to provide support, connectivity, and interoperability functions for various ones of the components of the riding lawn care vehicle 110.

In some example embodiments, the steering assembly 130 may be embodied as an assembly of metallic or other rigid components that may be welded, bolted, or otherwise attached to each other and operably coupled to the wheels 132 of the riding lawn care vehicle 110 to which steering inputs are provided. For example, the steering assembly 130 may include or otherwise be coupled with hydraulic motors that independently power drive wheels on each respective side of the riding lawn care vehicle 110. When a steering lever is pushed forward (e.g., away from the operator), the corresponding hydraulic motor may drive the corresponding wheel forward. When a steering lever is pulled backward (e.g., toward the operator), the corresponding hydraulic motor may drive the corresponding wheel backward. Thus, when both steering levers are pushed forward the same amount, the riding lawn care vehicle 110 travels forward in substantially a straight line since approximately the same amount of forward drive input is provided to each drive wheel. When both steering levers are pulled backward the same amount, the riding lawn care vehicle 110 travels backward in substantially a straight line since approximately the same amount of rearward drive input is provided to each drive wheel. When one steering lever is pushed forward and the other steering lever is pulled backward, the riding lawn care vehicle 110 begins to turn in a circle. Steering right and left may be accomplished by providing uneven amounts of input to the steering levers. When not in use, the steering levers may be placed in an outboard position (i.e., pivoted outward) to enable the operator to easily get into or out of the seat 120. Other steering control systems may be employed in some alternative embodiments.

Figure 3:
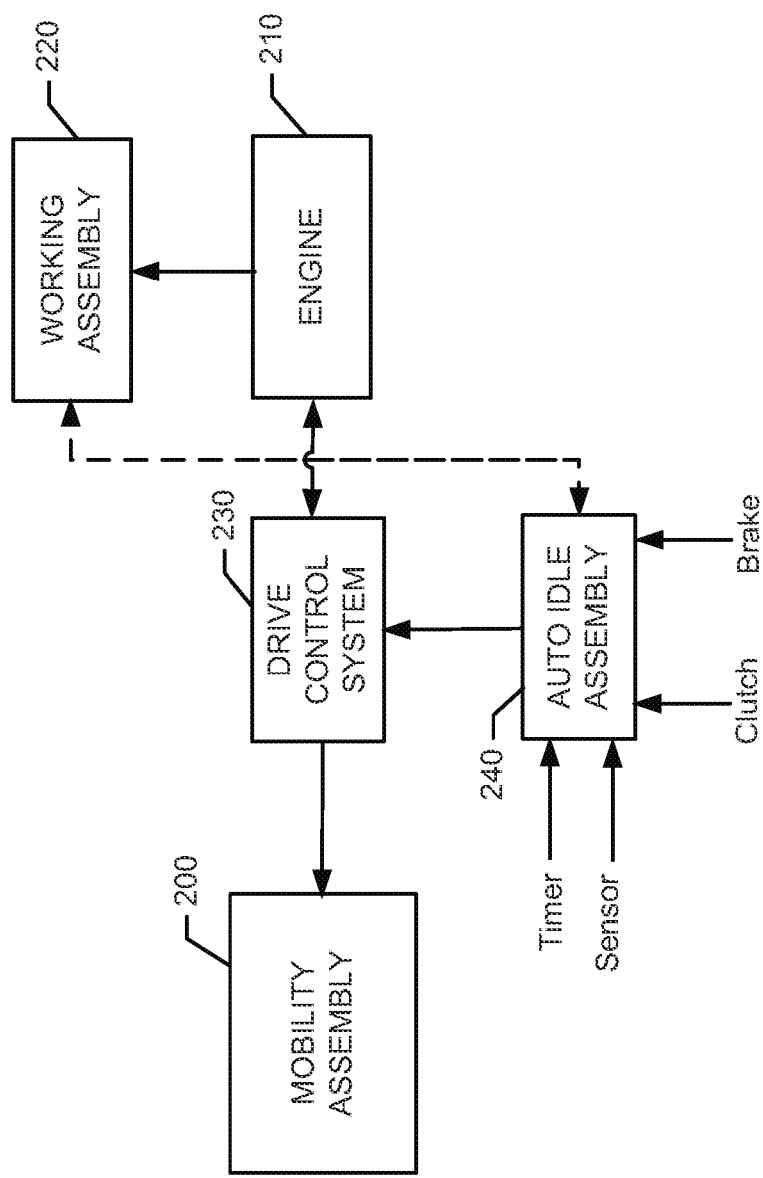
FIG. 3 illustrates a functional block diagram of a system for implementing auto idle control according to an example embodiment.

FIG. 3 illustrates a functional block diagram of a system for implementing auto idle control according to an example embodiment. As shown in FIG. 3, the system may include a mobility assembly 200 of a riding lawn care vehicle (e.g., riding lawn care vehicle 10 or 110). The mobility assembly 200 may include both the powered and non-powered wheels of the vehicle. The mobility assembly 200 may receive power for moving the vehicle from the engine 210. The engine 210 may also power a working assembly 220 of the vehicle. The working assembly 220 may include the cutting deck 40 or 140, or any other working attachment that may be operably coupled to the vehicle. In some cases, a belt drive system or other coupling mechanism may be employed to operably and selectively couple the engine 210 to the working assembly 220.

In an example embodiment, the engine 210 may be operably coupled to the mobility assembly 200 via a drive control system 230. The drive control system 230 may include a transmission, differential, governor, throttle control mechanism, and/or other drive system components configured to selectively and operably couple the engine 210 to the mobility assembly 200. An auto idle assembly 240 of an example embodiment may be operably coupled to the drive control system 230 to provide automatic initiation of throttle control functionality in accordance with the descriptions provided herein. In some embodiments, the auto idle assembly 240 may also provide inputs to and/or receive inputs from the working assembly 220 to control coupling of the engine 210 to the working assembly 220 and/or to receive status information on the working assembly 220 to form the basis for control of the drive control system 230.

The auto idle assembly 240 may be implemented as a series of mechanical linkages that physically move throttle control levers, valve positions, or other components that impact throttle position, or may be implemented as an electronic controller. Furthermore, in some embodiments, the auto idle assembly 240 may be implemented as a combination of electronic and mechanical control components. In an example embodiment, the auto idle assembly 240 may receive inputs that facilitate the generation of responses to the inputs to impact throttle position. In some cases, those inputs may include status information or data from sensors, timing information relative to various stimuli or events of interest, brake position, clutch position, and/or the like.

Figure 4:
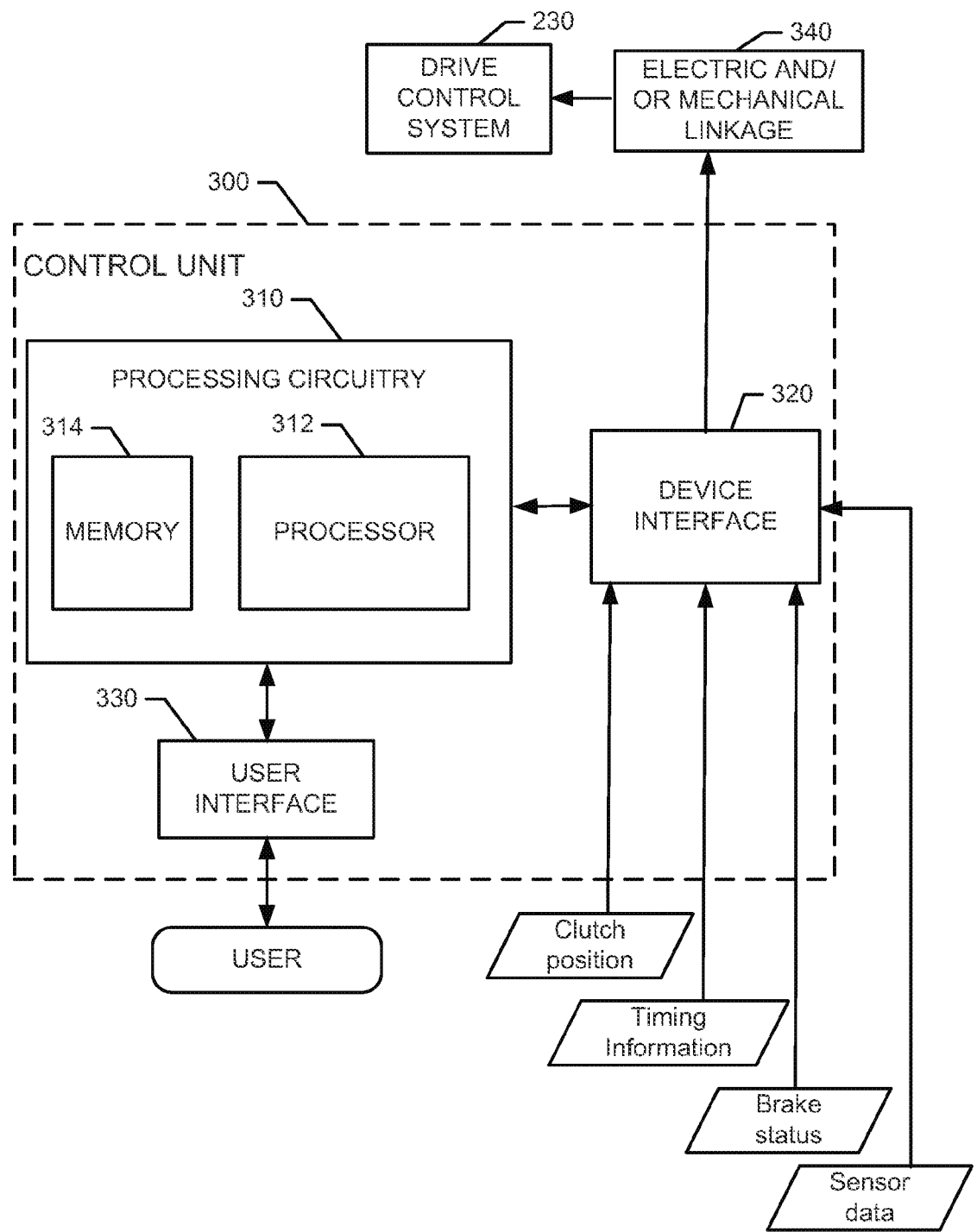
FIG. 4 illustrates a functional block diagram of a control unit that may interface with a drive control system directly or indirectly to control throttle position in accordance with an example embodiment.

In embodiments in which the auto idle assembly 240 includes electronically generated control of throttle position, a logic circuit or microprocessor may be employed. FIG. 4 illustrates an example of one such implementation. In this regard, FIG. 4 illustrates a control unit 300 that may interface with the drive control system 230 directly or indirectly to control throttle position. Thus, for example, the control unit 300 may generate a throttle control signal that may be communicated to electrical, mechanical, or electromechanical components.

As shown in FIG. 4, the control unit 300 may utilize the processing circuitry 310 to provide electronic control inputs to the drive control system 230 based on processing of various input information. The processing circuitry 310 may be configured to perform data processing, control function execution, and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software, or a combination of hardware and software) to perform operations described herein. However, in some embodiments, the processing circuitry 310 may be embodied as a portion of an on-board computer. In some embodiments, the processing circuitry 310 may communicate with various components and/or sensors of the riding lawn care vehicle 10 or 110.

The user interface 330 (if implemented) may be in communication with the processing circuitry 310 to receive an indication of a user input at the user interface 330 and/or to provide an audible, visual, mechanical, or other output to the user. As such, the user interface 330 may include, for example, a display, one or more levers, switches, indicator lights, buttons or keys (e.g., function buttons), and/or other input/output mechanisms of the operations panel 14.

The device interface 320 may include one or more interface mechanisms for enabling communication with other devices (e.g., sensors and/or other accessories or functional units such as motors, engines, servos, switches, or other operational control devices for providing control functions). In some cases, the device interface 320 may be any means such as a device or circuitry embodied in either hardware or a combination of hardware and software that is configured to receive and/or transmit data from/to sensors in communication with the processing circuitry 310.

The processor 312 may be embodied in a number of different ways. For example, the processor 312 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA, or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include, or otherwise control the operation of the control unit 300 based on inputs received by the processing circuitry 310 responsive to various operating conditions or component status indicators associated with the vehicle. As such, in some embodiments, the processor 312 (or the processing circuitry 310) may be said to cause each of the operations described in connection with the control unit 300 in relation to adjustments to be made to the drive control system 230 to undertake the corresponding functionalities responsive to execution of instructions or algorithms configuring the processor 312 (or processing circuitry 310) accordingly. In particular, the instructions may include instructions for operation of an electric and/or mechanical linkage 340 to control throttle position (e.g., to automatically set the throttle position to idle) based on operating conditions and component status as described herein.

In an exemplary embodiment, the memory 314 may include one or more non-transitory memory devices such as, for example, volatile and/or non-volatile memory that may be either fixed or removable. The memory 314 may be configured to store information, data, applications, instructions, or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the electric and/or mechanical linkage 340 as described herein.

As shown in FIG. 4, the control unit 300 may receive signals or information indicative of clutch position, timing information, brake status, and/or sensor data. The control unit 300 may then process the information received and make determinations regarding the provision of control signals via the electric and/or mechanical linkage 340. As an example, the control unit 300 may be configured to monitor clutch position in combination with parking brake position. If the engine has run for at least a predetermined time (e.g., based on the timing information) while the clutch is off and the parking brake is set, the control unit 300 may providing a control signal to trigger a transfer of the throttle to an idle position (i.e., directing entry into auto idle mode). If the brake is released, the engine may remain at idle. However, in some embodiments, if an input is sensed related to driving the mobility assembly 200 or the working assembly 220, the drive control system 230 may be further manipulated to return to a full throttle (or prior throttle) position within a specified time. For example, the control unit 300 may provide an input to the electric and/or mechanical linkage 340 to return the throttle to its prior position in a controlled manner over a period of a few seconds. While the vehicle is in operation, if the parking brake is actuated for a predetermined time period (e.g., 2-3 seconds) while the cutting deck is disengaged, the drive control system 230 may be manipulated by the control unit 300 to trigger a transfer of the throttle to the idle position.

Similarly, if the mower is shifted to a neutral state for a predetermined time (which may be the same or different as the time used in the brake and clutch position monitoring above, and which may be implemented in addition to or as an alternative to the brake and clutch position monitoring above), the engine may shift to idle mode. Thus, for example, if the transmission is in neutral for the predetermined time or if the steering levers are in neutral for the predetermined time (regardless of brake position), the shift to idle mode may be conducted.

A controlled return out of auto idle may be particularly useful for fixed ground speed vehicles like the one in FIG. 2, but this can also be useful in connection with returning to a prior throttle position for variable speed units as well. This may prevent lunging and may be particularly useful for vehicles on an inclined surface. However, entry into auto idle may be effected in a relatively expeditious manner. Thus, for example, when actuated, auto idle may have a first time limit for actuation that may be relatively short (e.g., less than one second). However, release from auto idle may be relatively slower (e.g., over a number of seconds).

In some embodiments, sensors may be used to detect various conditions and further provide inputs to the control unit 300. For example, particular sensors may be employed to detect when the vehicle is on an inclined surface and/or detect a degree of incline. Auto idle may be initiated by the control unit 300 responsive to the detection of a threshold amount of incline. In some cases, the control unit 300 may further initiate disconnection of drive power to the cutting deck responsive to the threshold amount of incline being detected. In some embodiments, detection of placement of the steering levers in an outboard position (e.g., for the vehicle of FIG. 2) may cause transition into auto idle.

In an example embodiment in which a bagging attachment is included (e.g., the vehicle of FIG. 1), a sensor may be provided to detect a full bagging attachment. When the sensor provides an input to the control unit 300 indicative of the bagging attachment being full, a signal may be generated by the control unit 300 to shift the vehicle into auto idle. Shifting the throttle position to idle may quiet the engine so that an alarm or buzzer that may also be provided to indicate that the bagging attachment is full can more easily be heard. Sensors may alternatively or additionally provide indications of perimeter faults, objects within a predetermined distance of the vehicle, front wheels being off the ground, and/or the like. Object sensors may operate based on optical sensing, infra red sensing, heat sensing, or any other suitable technology. In some embodiments, if the vehicle has Bluetooth capability, receipt of a call may cause a shift into auto idle, and in some cases, may further stop operation of the cutting deck.

In some embodiments, the control unit 300 may further be configured to deactivate auto idle in response to certain criteria. For example, sensors may be provided to detect certain situations in which it may be desirable to deactivate auto idle. In some cases, deactivation of auto idle may be initiated in embodiments in which a PTO is employed (e.g., the vehicle of FIG. 1) by employing a proximity sensor such as a mechanical switch, conductive switch, echo locator, photo eye, and/or the like to recognize when a foot is proximate to a pedal for engaging drive. In some embodiments, auto idle may be overridden or deactivated to allow battery charging as well.

Figure 5:
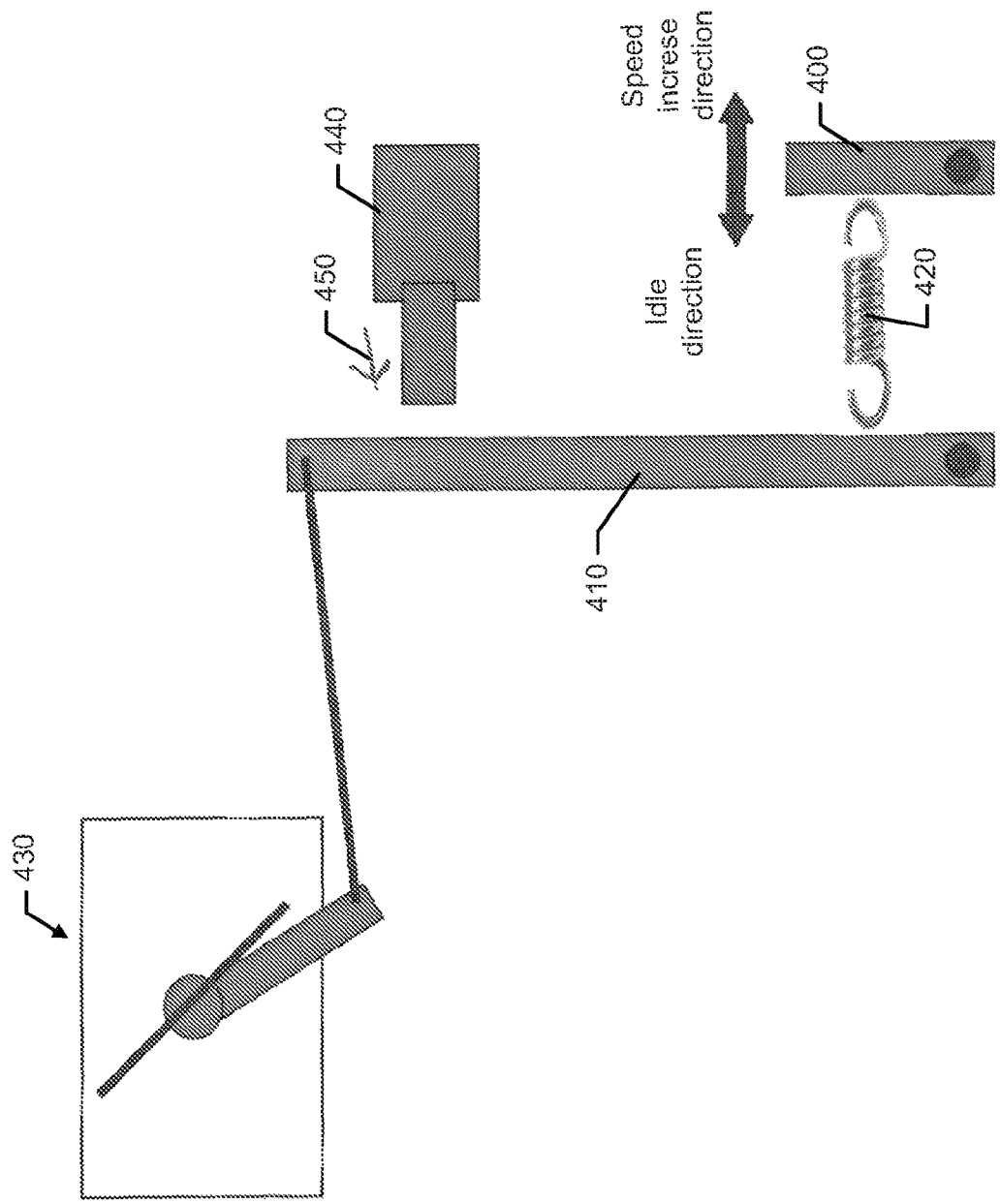
FIG. 5 illustrates a manual throttle control linkage according to an example embodiment.

In embodiments in which a mechanical linkage system is employed for providing the auto idle assembly, a structure similar to that shown in FIG. 5 may be employed. FIG. 5 illustrates a manual throttle control linkage 400, which may be a throttle control lever that is disposed at the operations panel 14. The manual throttle control linkage 400 is operably coupled to a governor linkage 410 via a biasing element, which in this case is embodied as a spring 420. The governor linkage 410 is operably coupled to a governor 430 to control the throttle position and therefore the amount of energy generated by the engine. As shown in FIG. 5, the manual throttle control linkage 400 may be pivoted in one direction to place the governor 430 in an idle state, and may be shifted in the other direction to increase engine operating speed.

In an example embodiment, a solenoid operated electronic plunger 440 may be provided to receive inputs for initiating auto idle. In an example embodiment, the control unit 300 of FIG. 4 may provide input to trigger the plunger 440, or another simple logic circuit may trigger the plunger 440. When conditions for initiation of auto idle are detected, the plunger 440 may be triggered to operate in the direction shown by the arrow 450 to push the governor linkage 410 and return the manual throttle control linkage 400 to the idle position (via the spring 420). The governor 430 may then be returned to the idle state. In an embodiment in which a return out of the idle state is desired to automatically deactivate auto idle, a second plunger or biasing element (not shown) may be provided to operate in a direction opposite to that of the arrow 450.

Figure 6:
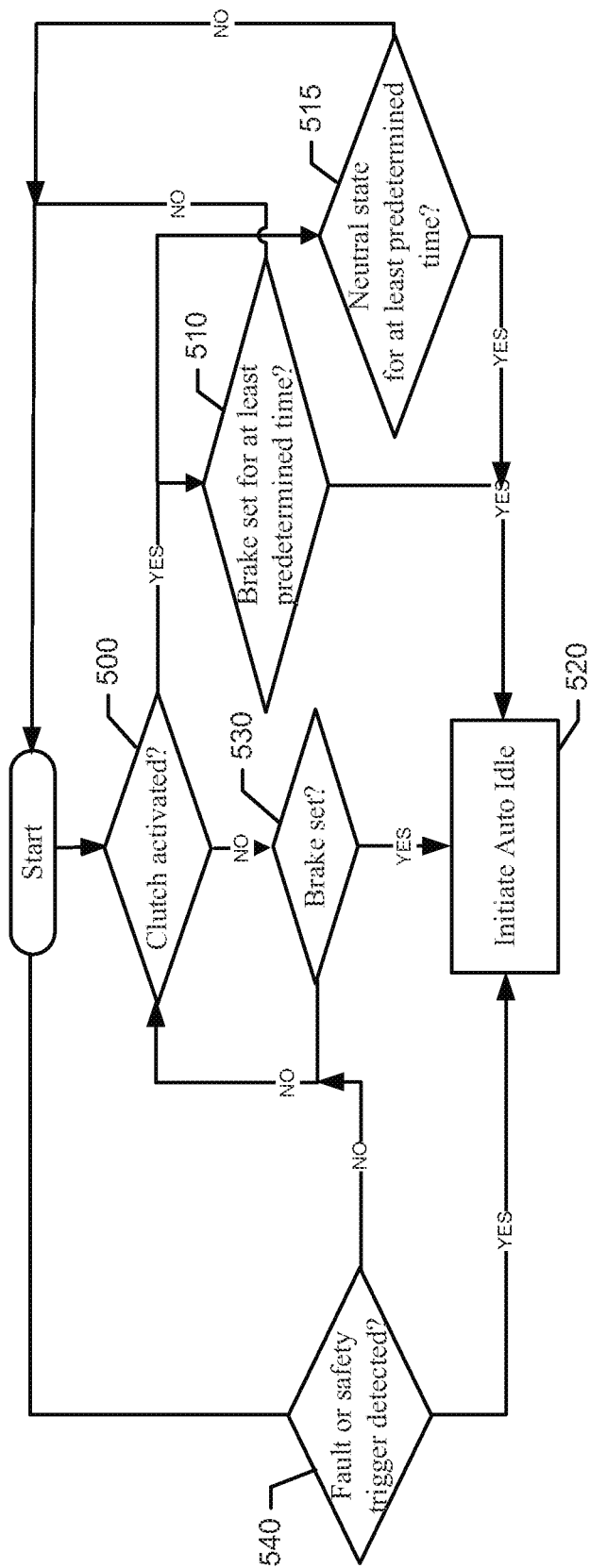
FIG. 6 illustrates an example flow diagram of the decision making process that may be undertaken by the control unit of an example embodiment.

FIG. 6 illustrates an example flow diagram of the decision making process that may be undertaken by the control unit of an example embodiment. In an example embodiment, a determination may be made as to whether the clutch is activated at operation 500. If the clutch is activated, then a determination may be made as to whether the brake is set for a predetermined time period at operation 510. If the brake is set for at least the predetermined time period, then auto idle may be initiated at operation 520. In parallel with the determination made at operation 510, a determination may be made as to whether the neutral state is maintained for a predetermined time at operation 515. If the neutral state is maintained for at least the predetermined time period, then auto idle may be initiated at operation 520. If the clutch is not activated, a determination may be made as to whether the brake is set (e.g., for any length of time) at operation 530. If the brake is set, then auto idle may be initiated at operation 520. If the brake is not set, continued monitoring for activation of the clutch may be continued at operation 500. In parallel with the monitoring for activation of the clutch, monitoring may occur relative to the occurrence of any fault or safety triggers (e.g., including those described above) at operation 540. If no faults or safety triggers are detected, monitoring for clutch activation may be performed at operation 500. However, if one or more of the fault conditions or safety triggers is detected, then auto idle may be initiated at operation 520.

Accordingly, a riding lawn care vehicle of an example embodiment may include a mobility assembly configured to support the riding lawn care vehicle during movement over ground, a working assembly configured to perform a working function, an engine operably coupled to the mobility assembly and the working assembly, a drive control system, and an auto idle assembly. The engine may be configured to selectively provide power to the mobility assembly and the working assembly. The drive control system may be configured to control delivery of the power from the engine to the mobility assembly. The auto idle assembly may be configured to automatically provide inputs to the drive control system to shift to an idle mode responsive to detection of predetermined criteria.

The lawn care device of some embodiments may include additional features that may be optionally added alone or in combination with each other. For example, in some embodiments, (1) the auto idle assembly may include a control unit configured to monitor at least clutch and brake positions and initiate the idle mode based on the clutch and brake positions. In some embodiments, (2) the vehicle may further include at least one sensor. The auto idle assembly may include a control unit configured to monitor a status of the at least one sensor and initiate the idle mode based on the status. In some cases, (3) the at least one sensor may be configured to detect incline of the riding lawn care vehicle. The control unit may be configured to initiate the idle mode responsive to the incline being greater than a predetermined amount. In an example embodiment, (4) the at least one sensor may be configured to detect proximity of an object to the riding lawn care vehicle. The control unit may be configured to initiate the idle mode based on the proximity of the object. In some embodiments, (5) the at least one sensor may be configured to detect an incoming call to an operator of the riding lawn care vehicle. The control unit may be configured to initiate the idle mode responsive to detection of the incoming call. In some cases, (6) the at least one sensor may be configured to detect a full bagging attachment of the riding lawn care vehicle, and the control unit may be configured to initiate the idle mode responsive to detection of the full bagging attachment. In an example embodiment, (7) the at least one sensor may be configured to detect placement of steering levers of the riding lawn care vehicle in an outboard position, and the control unit may be configured to initiate the idle mode based on detection of the steering levers placed in the outboard position. In some embodiments, (8) the at least one sensor may be configured to detect a neutral state of the vehicle, and the control unit may be configured to initiate the idle mode based on detection of the neutral state for at least a predetermined time. In some cases, (9) the at least one sensor may be configured to detect a deactivation condition, and the control unit may be configured to deactivate the idle mode responsive to detection of the deactivation condition. In such an example embodiment, the sensor may be a proximity sensor. In some example embodiments, (10) the auto idle assembly may further be configured to decouple the working assembly from the engine during the shift to the idle mode.

In some embodiments, any or all of (1) to (10) may be employed in addition to the optional modifications or augmentations described below. For example, in some embodiments, the auto idle assembly may include mechanical linkages between a manual throttle control lever and a governor of the engine. In such an example, activation of a solenoid responsive to the predetermined criteria may urge the mechanical linkages to move the throttle control lever to an idle position to adjust the governor to the idle mode. Alternatively or additionally, the auto idle assembly may be enabled after the engine has been running for at least a predetermined period of time. Alternatively or additionally, the auto idle assembly may initiate shifting to the idle mode based on the predetermined criteria being met for at least a predetermined period of time. Alternatively or additionally, the auto idle assembly may be configured to restore throttle position to a previous setting after shifting to the auto idle mode responsive to clearing of the predetermined criteria. Alternatively or additionally, the auto idle assembly may be configured to close the throttle position within a first time period in response to a shift to the idle mode, and reopen the throttle position within a second time period responsive to clearing of the predetermined criteria. In such an example, the second time period may be longer than the first time period.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:
1. A riding lawn care vehicle comprising:
a mobility assembly configured to support the riding lawn care vehicle during movement over ground;
a working assembly configured to perform a working function;
an engine operably coupled to the mobility assembly and the working assembly, the engine comprising a throttle and being configured to selectively provide power to the mobility assembly and the working assembly;

a drive control system configured to control delivery of the power from the engine to the mobility assembly; and an auto idle assembly comprising a control unit configured to detect predetermined criteria, the predetermined criteria including at least clutch and brake positions of the riding lawn care vehicle, wherein in response to the control unit detecting the predetermined criteria, the control unit is further configured to automatically provide inputs to the drive control system to cause a shift of the throttle to an idle position.

2. The riding lawn care vehicle of claim 1, further comprising at least one sensor, wherein the control unit is further configured to monitor a status of the at least one sensor and initiate the shift of the throttle to the idle position based on the status.

3. The riding lawn care vehicle of claim 2, wherein the at least one sensor is configured to detect incline of the riding lawn care vehicle, and wherein the control unit is configured to initiate the shift of the throttle to the idle position responsive to the incline being greater than a predetermined amount.

4. The riding lawn care vehicle of claim 2, wherein the at least one sensor is configured to detect proximity of an object to the riding lawn care vehicle, and wherein the control unit is configured to initiate the shift of the throttle to the idle position based on the proximity of the object.

5. The riding lawn care vehicle of claim 2, wherein the at least one sensor is configured to detect an incoming call to an operator of the riding lawn care vehicle, and wherein the control unit is configured to initiate the shift of the throttle to the idle position responsive to detection of the incoming call.

6. The riding lawn care vehicle of claim 2, wherein the at least one sensor is configured to detect a full bagging attachment of the riding lawn care vehicle, and wherein the control unit is configured to initiate the shift of the throttle to the idle position responsive to detection of the full bagging attachment.

7. The riding lawn care vehicle of claim 2, wherein the at least one sensor is configured to detect placement of steering levers of the riding lawn care vehicle in an outboard position, and wherein the control unit is configured to initiate the shift of the throttle to the idle position based on detection of the steering levers placed in the outboard position.

8. The riding lawn care vehicle of claim 2, wherein the at least one sensor is configured to detect a neutral state of the vehicle, and wherein the control unit is configured to initiate the shift of the throttle to the idle position based on detection of the neutral state for at least a predetermined time.

9. The riding lawn care vehicle of claim 2, wherein the at least one sensor is configured to detect a deactivation condition, and wherein the control unit is configured to deactivate the auto idle assembly responsive to detection of the deactivation condition.

10. The riding lawn care vehicle of claim 9, wherein the at least one sensor comprises a proximity sensor.

11. The riding lawn care vehicle of claim 1, wherein the auto idle assembly is further configured to cause a decoupling of the working assembly from the engine during the shift of the throttle to the idle position.

12. The riding lawn care vehicle of claim 1, wherein, in response to the detection of the predetermined criteria by the control unit, a solenoid of the auto idle assembly urges mechanical linkages to move a biasing element of a throttle control lever in an idle direction to adjust a governor thereby causing the shift of the throttle to the idle position.

13. The riding lawn care vehicle of claim 1, wherein the auto idle assembly is enabled after the engine has been running for at least a predetermined period of time.

14. The riding lawn care vehicle of claim 1, wherein the control unit initiates shifting the throttle to the idle position based on the predetermined criteria being met for at least a predetermined period of time.

15. The riding lawn care vehicle of claim 1, wherein, in response to a clearing of a detected predetermined criteria, the control unit is configured to cause a restoration of the throttle from the idle position to a previous position.

16. An auto idle assembly of a riding lawn care vehicle, the riding lawn care vehicle further comprising a mobility assembly configured to support the riding lawn care vehicle during movement over ground, a working assembly configured to perform a working function, an engine operably coupled to the mobility assembly and the working assembly and comprising a throttle, and a drive control system configured to control delivery of the power from the engine to the mobility assembly, the engine configured to selectively provide power to the mobility assembly and the working assembly, wherein the auto idle assembly comprises a control unit configured to detect predetermined criteria, the predetermined criteria including at least clutch and brake positions of the riding lawn care vehicle and, in response to the detection of the predetermined criteria, automatically provide inputs to the drive control system to cause a shift of the throttle to an idle position.

17. The auto idle assembly of claim 16, wherein, in response to the detection of the predetermined criteria, a solenoid of the auto idle assembly urges mechanical linkages to move a biasing element of a throttle control lever in an idle direction to adjust a governor thereby causing the shift of the throttle to the idle position.

18. The auto idle assembly of claim 16, wherein the auto idle assembly is further configured to cause a decoupling of the working assembly from the engine during the shift of the throttle to the idle position.

* * * * *